(12) United States Patent
Erben

(10) Patent No.: US 6,751,396 B2
(45) Date of Patent: Jun. 15, 2004

(54) INTEGRATED OPTICAL DEVICES AND METHOD OF FABRICATION THEREFOR

(75) Inventor: Christoph Georg Erben, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/326,346

(22) Filed: Dec. 20, 2002

(65) Prior Publication Data

US 2003/0123806 A1 Jul. 3, 2003

Related U.S. Application Data

(63) Continuation-in-part of application No. 10/032,798, filed on Dec. 26, 2001.

(51) Int. Cl.[7] .................................................. G02B 6/00
(52) U.S. Cl. ........................ 385/141; 385/131; 385/143
(58) Field of Search .............................. 385/14, 1, 2, 3, 385/129, 130, 131, 141, 142, 143, 144, 145

(56) References Cited

U.S. PATENT DOCUMENTS

| | | | | | |
|---|---|---|---|---|---|
| 4,859,876 | A | * | 8/1989 | Dirk et al. | 385/2 |
| 4,902,086 | A | * | 2/1990 | Henry et al. | 385/130 |
| 5,108,201 | A | * | 4/1992 | Matsuura et al. | 385/143 |
| 5,473,711 | A | * | 12/1995 | Hakogi et al. | 385/14 |
| 5,533,151 | A | * | 7/1996 | Leonard | 385/3 |
| 5,857,039 | A | * | 1/1999 | Bosc et al. | 385/14 |
| 6,198,855 | B1 | * | 3/2001 | Hallemeier et al. | 385/2 |
| 6,310,999 | B1 | * | 10/2001 | Marcuse et al. | 385/42 |
| 6,330,378 | B1 | * | 12/2001 | Forrest et al. | 385/14 |
| 6,381,380 | B1 | * | 4/2002 | Forrest et al. | 385/14 |
| 2001/0055458 | A1 | * | 12/2001 | Ladd | 385/129 |

* cited by examiner

Primary Examiner—Frank G. Font
Assistant Examiner—Juan D Valentin

(57) ABSTRACT

The present invention provides an optical apparatus, a method of manufacture therefore, and an optical integrated circuit that includes the optical apparatus. The optical apparatus comprises a substrate, a first waveguide core formed in the substrate and a second waveguide core comprising an organic polymer formed in the substrate second waveguide core having a different composition than said first waveguide core and optically coupled to the first waveguide core.

20 Claims, 5 Drawing Sheets

INTEGRATED OPTICAL DEVICES AND METHOD OF FABRICATION THEREFOR

CROSS-REFERENCE TO RELATED APPLICATION

This application is a continuation in part of U.S. patent application Ser. No. 10/032,798, ('798) entitled filed on Dec. 26, 2001, by Christoph G. Erben et al., which is commonly assigned with the present application and incorporated herein by reference herein in its entirety.

TECHNICAL FIELD OF THE INVENTION

The present invention is directed in general to an optical apparatus, a method of manufacture thereof, and an optical integrated circuit comprising the optical apparatus.

BACKGROUND OF THE INVENTION

Optical communication devices typically include several discrete active and inactive device components, each performing different functions. Examples of individual device components include optical switches, electro-optic modulators, arrayed waveguide gratings (AWG), waveguide splitters, or optical amplifiers. Such device components are typically fabricated individually using different processes on different substrates. As an example, an AWG is fabricated in a silica substrate, while an electro-optic modulator is fabricated in a lithium niobate substrate.

Heretofore, it has not been practical to fabricate two different optical devices, such as passive and active electro-optic devices, on a single substrate. Typically the waveguide core for an optical device is formed in an inorganic substrate, such as silica, by doping the substrate. For example, the portion of the substrate in which the waveguide is located is doped with a single type of dopant. It has proven difficult to selectively dope discrete portions of silica to form the waveguide cores for different types of devices. Thus, for example, the entire silica wafer may serve as the substrate for forming components of an electro-optic modulator or of an AWG, but not both. Rather than form two different types of optical devices on a single substrate discrete device components are fabricated on separate substrates and then interconnected via optical fibers.

The separate fabrication and interconnection of such discrete device components, however, adds significant manufacturing costs. In particular, the high precision required to properly align interconnecting optical fibers with the discrete devices amounts to a substantial portion of the cost of fabricating the optical device system. Moreover, optical losses where the discrete device components are interconnected, degrade performance of the optical device.

Accordingly, what is needed in the art is an optical apparatus that integrates optical devices capable of meeting the stringent requirements of the optoelectronic industry, while not experiencing the problems associated with previous optical devices.

SUMMARY OF THE INVENTION

To address the above-discussed deficiencies, one embodiment of the present invention provides an optical apparatus. The optical apparatus includes a substrate, a first waveguide core formed in the substrate and a second waveguide core. The second waveguide core comprises an organic polymer formed in the substrate and optically coupled to the first waveguide core. The second waveguide core has a different composition than the first waveguide core.

In another embodiment, the invention further provides a method of manufacturing an optical apparatus. The method comprises providing a substrate and forming a first waveguide core in the substrate. The method further includes forming a second waveguide core comprising an organic polymer in the substrate, wherein the second waveguide core is optically coupled to the first waveguide core and has a different composition than the first waveguide core.

Yet another embodiment of the present invention provides an optical integrated circuit. The optical integrated circuit comprises a first optical device and a second optical device. The first optical device includes a first waveguide core formed in a substrate, and the second optical device includes a second waveguide core comprising a polymer formed in the substrate and optically coupled to the first waveguide core and has a different composition than the first waveguide core.

BRIEF DESCRIPTION OF THE DRAWINGS

The invention is best understood from the following detailed description, when read with the accompanying FIGUREs. It is emphasized that in accordance with the standard practice in the opto-electronic industry, various features may not be drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Embodiments of the present invention benefit from the recognition that multiple discrete optical devices can be constructed on one substrate, with the discrete device components optically coupled to each other to form an optical apparatus. Embodiments of such optical devices advantageously eliminate the need for individual packaging and interconnecting of discrete optical device components, thereby leading to cost-savings in fabrication compared to conventionally made optical devices. Furthermore, certain embodiments of optical integrated circuits incorporating such devices benefit by having lower optical losses compared to conventionally made optical integrated circuits.

Figure 1:
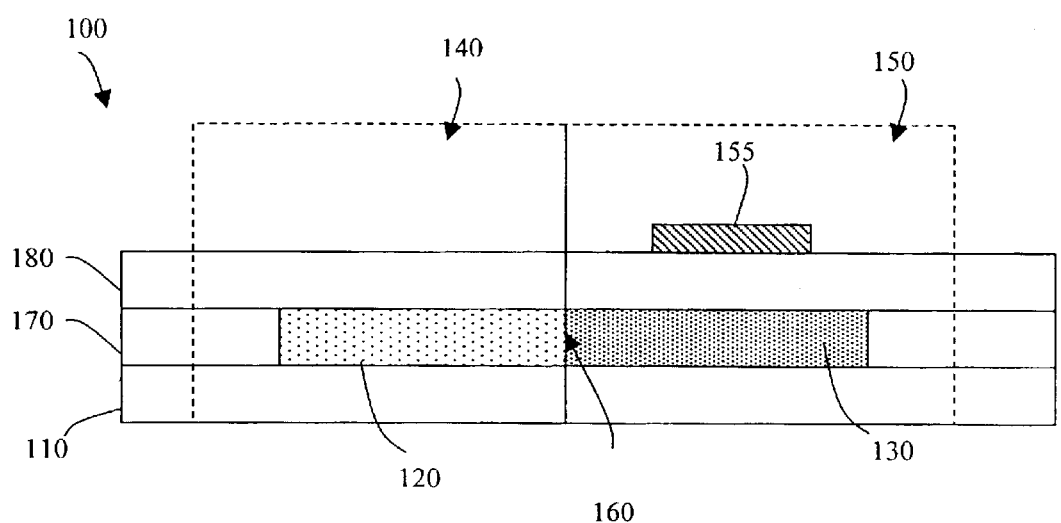
FIG. 1 illustrates a membranous cross-sectional view of one embodiment of an optical apparatus constructed according to the principles of the present invention.

Referring initially to FIG. 1, illustrated is a cross sectional view of one embodiment of an optical apparatus 100 constructed according to the principles of the present invention. The optical apparatus 100 includes a substrate 110, a first waveguide core 120 formed in the substrate 110 and a second waveguide core 130 formed in the substrate 110. The second waveguide core 130 is optically coupled to the first waveguide core 120 and comprises an organic polymer. The composition of second waveguide core 130 differs from the first waveguide core 120.

The term waveguide core as used herein refers to material that is transparent to one or more wavelengths of light comprising an optical signal. In some embodiments, the first waveguide core 120 comprises a matrix of inorganic materials, such as silica or lithium niobate. In certain preferred embodiments where the first waveguide core 120 comprises inorganic materials, the first waveguide core 120 includes a dopant, thereby providing a core that is appropriate for the intended function of the first waveguide core.

For example, in embodiments of passive waveguide applications, such as when the first waveguide core 120 is used in an AWG, the dopant is titanium or germanium. In embodiments of optical amplifier applications, the dopant comprises rare earth metals. The term rare earth metal as used herein, refers to atoms from the lanthanide series of the Periodic Chart of Elements. For example, when the first waveguide core 120 is used as an optical amplifier, the first waveguide core can comprise silica doped with erbium (III). In yet other embodiments, the first waveguide core 120 includes lithium niobate doped with Ti. Alternatively, the lithium niobate is prepared by an annealed proton-exchange process using methods well known to those skilled in the art.

In other embodiments, both the first and second waveguide cores 120, 130 both comprise organic polymers. In such embodiments, it is preferable for the matrix of the organic polymers of the first and second core 120, 130 to have different chemical compositions. Examples of preferred composition for the organic polymers include acrylates, epoxides, polyimides, cyclic olefin copolymers or combinations thereof. In preferred embodiments, the organic polymers comprise a copolymer of PMMA and HEMA. In yet other preferred embodiments, the waveguide cores 120, 130 comprise silsesquioxane polymers, as discussed in U.S. Pat. No. 5,962,067 to Bautista et al. ("Bautista"), incorporated herein by reference.

For example, in embodiments where the optical apparatus 100 includes an electro-optic modulator, the organic polymer or second organic polymer comprise a mixture of polymers having electro-optic activity, where the organic dye is attached as a side chain to the polymer. Examples include copolymers comprising polymethylmethacrylate (PMMA), hydroxyethylmethacrylate (HEMA), and one or more chromophores. Examples of appropriate chromophores include organic dyes, such as azo dyes like N-Ethyl-N-(2-hydroxyethyl)-4-(4-nitrophenylazo)aniline (commercially available Disperse Red 1 "DR1," product no. 21,574-0, from Sigma-Aldrich Chemicals, St. Louis, Mo.). Additional examples of polymers that are directly electro-optic include mixtures of PMMA and chromophores, such as 4,4'-oxynitro stilbene or 4-dimethylamino-4'-nitrostilbene, attached as side-chains to PMMA. After depositing such organic polymers in the channel, an electrical field is applied to the polymer to pole the polymer and thereby achieve electro-optic activity as further discussed in the above-described '798 patent. In alternative embodiments, however, the organic polymers comprise a mixture of PMMA and the chromophore in a guest-host type of configuration.

Embodiments of the optical apparatus 100 include a passive device 140, where the properties of light passing through the waveguide core, such as the first waveguide core 120, of the device 140 are substantially unmodified. In some embodiments of the passive device 140, one or both of the first or second waveguide cores 120, 130 used therein is doped, although in other embodiments the appropriate waveguide core 120, 130 is not doped. For instance, in certain embodiments, one of the first and second waveguide cores 120 130, is undoped and the other of the first or second waveguide 120, 130 core is doped by rare earth atoms.

Still other embodiments of the optical apparatus 100 include an active device 150 where one or more of the properties of light, such as wavelength or amplitude, comprising an optical signal passing through the waveguide core 130 of the device 150 are modified. For example, in some embodiments, where the optical apparatus 100 includes an active device 150, such as an optical amplifier, one or both of the first or second waveguide core 120, 130 used therein is doped with a rare earth atom, such as Erbium (III). In other embodiments including an active device 150, however, the waveguide cores 120, 130 is not doped. Rather, in such embodiments, the properties of light passing through the waveguide cores 120, 130 is altered by an action performed on the waveguide cores 120, 130, such as localized heating. Other embodiments of the optical apparatus 100 include additional waveguide cores, having the same or different compositions as the first and second waveguide cores 120, 130, each waveguide core being used in a multitude of different active or passive optical devices (not shown).

In certain embodiments where the optical apparatus 100 includes an electro-optic modulator, the first waveguide core 120 has a less electro-optically controllable refractive index than the second waveguide core 130. For example, a current applied to an electrode 155, proximate the second waveguide core 130, generates an electrical field that modulates the refractive index of the second waveguide core 130 by more than about $10^{-4}$, whereas an equivalent electrical field applied to the first waveguide core 120 would modulate the refractive index of the first waveguide core 120 by less than about $10^{-5}$. In other embodiments, however, the second waveguide core 130 has a less electro-optically controllable refractive index than the first waveguide core 120.

In yet other embodiments, the first and second waveguide cores 120, 130 are optically coupled indirectly by evanescent field coupling. In such embodiments, the first and second waveguide cores 120, 130 are in close enough proximity to each other that power is transferred from one waveguide core to the other. Alternatively, the first and second waveguide cores 120, 130 are serially optically coupled, so that the optical output from the first waveguide core 120 is directly coupled to the input of the second waveguide core, 130 or vice versa at an interface 160.

In embodiments where the first and second waveguide cores 120, 130 are serially connected, it is desirable to select materials for the first and second waveguide cores 120, 130 that minimize optical losses at the interface 160. For example, in certain preferred embodiments, the refractive indexes of the first and second waveguide cores 120, 130 are within at least about ±0.001 refractive index units. A good match between the refractive index of the first and second waveguide cores 120, 130 helps to minimize the optical losses at the interface 160 by minimizing the reflection of the optical signal passing from the first waveguide core 120 to the second waveguide core 130.

Examples of organic polymers having substantially the same refractive indexes are PMMA/HEMA/DR1, used in electro-optic modulator device applications, mercapto-ester type epoxy polymers (e.g., product number NOA 68, Norland Products, Cranbury N.J.) used in passive waveguide device applications, and fluoropolymers doped with erbium (III) used in amplifier device applications. All three of these types organic polymers have refractive indexes within about ±0.001 refractive index units of about 1.5 at a wavelength of about 1550 nm.

In preferred embodiments, where the difference in the refractive index of the first and second waveguide core 120, 130 is less than about 0.001, the optical loss of a signal passing from the first waveguide core 120 to the second waveguide core 130 is less than about 0.1 dB. More preferable are embodiments where the difference in the refractive index of the first and second waveguide core 120, 130 is less than about 0.0001, and the optical loss of a signal passing from the first to the second waveguide cores 120, 130 is less than about 0.01 dB.

Embodiments of the optical apparatus 100, include waveguide cores 120, 130 have a variety of shapes commonly used in the opto-electronics industry. The shape of the waveguide cores 120, 130 are substantially defined by the shape of channels formed in the substrate or cladding, as further discussed below. In certain preferred embodiments, one or both of the waveguide core 120, 130 have at least one substantially planar surface that is substantially parallel to the substrate 110 or cladding layers 170, 180, as defined by the deposition and patterning processes used to form the waveguide core 120, 130, as further described below. In other preferred embodiments, the waveguide cores 120, 130 are substantially rectangular in shape, although square and trapezoid shapes are also within the scope of the present invention. In yet other preferred embodiments, the waveguide cores 120, 130 are substantially cylindrical.

In certain embodiments, the substrate 110 directly serves as the cladding for the first and second waveguide cores. In such embodiments, it is desirable for the substrate 110 to be optically transparent and have a refractive index that is lower than the refractive index of the waveguide cores. Examples of suitable substrates 110 include glass, silicon, silica, silicon dioxide, plastic or other well known materials used in the fabrication of opto-electric devices. In embodiments of the optical apparatus 100 where the substrate 110 serves as a cladding, the substrate has a refractive index that is at least about 0.01 percent lower than a refractive index for the first and second waveguide cores, so as to allow a guided mode of light to form and transmit through the waveguide cores 120, 130. Examples of plastic substrates 110 that also serve as a cladding include: sol-gel materials, polyamides, polyolefins, polyacrylates including poly(meth)acrylates, such as PMMA:HEMA mixtures, polyethers, polycarbonates and polysilsesquioxanes, although other plastics commonly used in the optoelectronics industry may be used. Preferably, such plastic substrates 110 further comprises fluorinated materials.

Alternative preferred embodiments of the optical apparatus 100 further include a cladding layer 170 formed over the substrate 110. Other preferred embodiments of the optical apparatus 100 also include an upper cladding layer 180, formed over the waveguide cores 120, 130. In preferred embodiments, the cladding and upper cladding 170, 180 are each at least about 2 microns thick and have a refractive index that is at least about 0.01 percent lower, and more preferably at least about 0.1 percent lower than a refractive index for either the first and second waveguide cores 120, 130. In other preferred embodiments, the cladding 170, 180 comprises the same types of plastic as described above for the composition of the substrate 110. Preferred embodiments of the optical apparatus 100 also include an upper cladding layer 180 comprising the same material used for the cladding layer 170. However, different materials may be used for the cladding and upper cladding layers, 170, 180 although preferably, their refractive indexes are substantially the same (e.g., refractive index within about ±0.001). For example, in certain embodiments where the substrate 110 comprises silica, and the substrate 110 also serves as the cladding 170, then if the upper cladding 180 is a plastic, it preferably has a refractive index that is the same as the refractive index of the silica comprising the cladding 170.

Figure 2A:
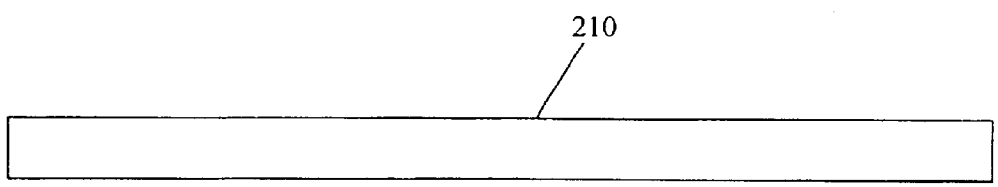
FIGS. 2A–2E are sectional views of an optical apparatus as covered by an embodiment of the present inventions at various stages of a method of manufacture.

FIGS. 2A–2E illustrate one method for manufacturing the embodiments similar to the optical apparatus 100 illustrated in FIG. 1. Similar reference numbers are used to depict analogous structural features shown in FIG. 1. A substrate 210 is provided or formed as illustrated in FIG. 2A. A first cladding layer 270, is then deposited over the substrate 210 and channels 275 and 277 are formed therein. The substrate 110 and first cladding layer 270 may be any of the materials mentioned above. As discussed below, at least one of the channels will be filled with the organic polymer used to form one of the waveguide cores.

Channels 275 and 277 are preferably formed in an etching step, such as reactive ion etching (RIE). Areas to be etched are exposed to a suitable etchant gas and applied voltage, well know to those skilled in the art, to form a reactive plasma. To etch organic polymers, the etchant gas preferably comprises oxygen, while to etch inorganic materials such as silica, the etchant gas preferably comprises sulphur hexafluoride or carbon tetrafluoride.

In alternative embodiments, the channels 275, 277 are formed in plastic substrates by a molding process. In such a process, melted or softened plastic is contacted to a mold with raised portions that outline the desired pattern for the channels 275, 277. In an alternative process, a cladding pre-polymer is contacted with the mold, and then polymerized while in contact with the mold. The cladding prepolymer preferably comprises monomers of the plastic cladding, or more preferably, partially polymerized oligomers of the plastic cladding that are liquid. Such embodiments are preferred because the cladding pre-polymer will more readily contact all the raised portions of the pattern on the surface of the mold than a fully polymerized solid polymer. The cladding pre-polymer is then cured or polymerized to a more fully cross-linked structure while in contact with the mold. Alternatively, the cladding 270 is then allowed to cool while still contacting the mold, so as to allow the pattern in the mold to be embossed into the substrate 210 or cladding 270 to form the channels 275, 277.

Preferred embodiments of the channels 275, 277 have dimensions ranging from about 8 by about 8 microns to about 5 by about 5 microns. The selected dimensions of the channels 275, 277 are governed in part by the difference in refractive index between the later-formed waveguide cores and substrate 210 or cladding material 270 surrounding the later-formed waveguide cores.

Figure 2B:
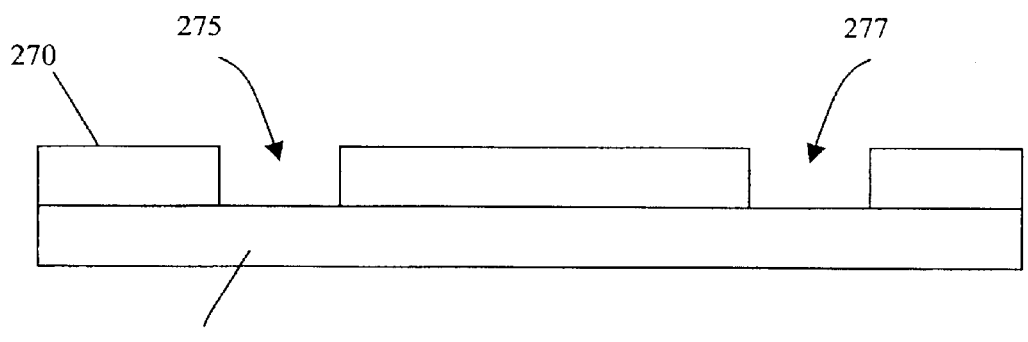
Figure 2C:
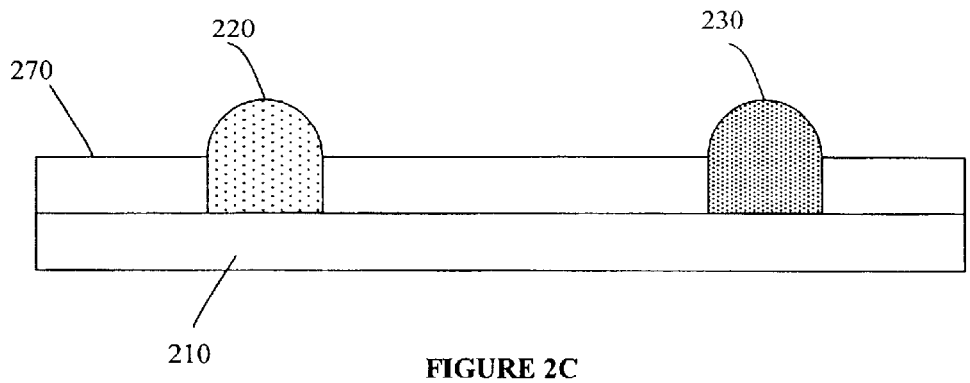

Turning now to FIG. 2C, there is illustrated a sectional view of the channels 275, 277 of FIG. 2B after having been filled with the organic polymer. The filling step uses a fluid-dispensing device, such as a syringe, or an ink-jet sprayer. For embodiments where both the first and second waveguide cores 220, 230 comprise organic polymers, the polymers are sequentially filled into the appropriate channels 275, 277 using a multi-chambered ink-jet sprayer. The use of the multi-chambered ink-jet sprayer is desirable because this allows both organic polymers to be filled into their respective channels 275, 277 over the same period, thereby eliminating the need for separate processing steps.

To facilitate uniform filling of the channels, in certain preferred embodiments, the channels 275, 277 are filled with a liquid comprising a waveguide core pre-polymer. The waveguide core pre-polymer includes monomers or partially polymerized oligomers of an organic polymer. It is desirable for the filling liquid, to have a high enough viscosity (e.g., between about 1000 and about 2000 Centipoise) to retard spreading of the polymer or core pre-polymer to regions substantially outside of the channels 275, 277. In some embodiments, the filling liquid includes a cross-linking agent or curing agent. In other embodiments, the cross-linking agent is separately deposited into the channel 277, via a separate syringe or separate dispenser in the ink-jet sprayer.

In embodiments where the first and second waveguide core 220, 230 both comprise organic polymers, it is advantageous to fill the channels 275, 277 with the appropriate waveguide core pre-polymers for the first and second waveguide cores 220, 230, and allow both pre-polymers to cure over the same period. In embodiments where the first and second waveguide cores are serially optically coupled, it is also desirable for the pre-polymers for the organic polymer and second organic polymer to be capable of blending together at the interface between the first and second waveguide cores 220, 230, to facilitate the formation of device structures with efficient optical coupling of light passing, for example, from the first and second waveguide cores 220, 230. In some embodiments, to achieve a smooth interface between the first and second waveguide cores 220, 230, it is preferable for the pre-polymers to be miscible with each other.

In other embodiments, it is preferable for the pre-polymers of the core waveguides 220, 230 to be capable of wetting each other, so as to avoid the formation of air bubbles and creation of voids at the interface between the first and second waveguide cores when filling the channels 275, 277 with suitable pre-polymers. Examples of pre-polymers that are capable of wetting each other include pre-polymers corresponding to the above-mentioned PMMA/HEMA and mercapto-ester type epoxy polymers used in electro-optic modulator and passive waveguide device applications, respectively.

It is also advantageous for the pre-polymers to be non-volatile and not to contain gases dissolved therein, so that gases are not produced or released during the filling of the channels 275, 277 and curing of the pre-polymers. It is therefore preferable to include a step of degassing the pre-polymers prior to filling the channels 275, 277. It is also desirable for the polymerization of the pre-polymers to not generate by-products during curing that effect the optical properties of the waveguide cores, such as volatile side-products that could result in the formation of voids in the organic polymer matrix after curing of the pre-polymers. Examples of suitable pre-polymers that generate substantially no by-products during polymerization include cyclobutenes (e.g., cyclotene and perflurocyclobutene, both from Dow Chemical Companys, Midland, Mich.).

Figure 2D:
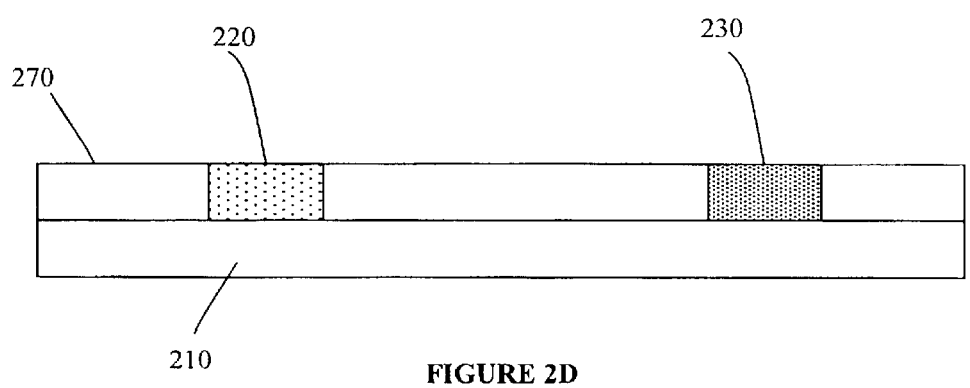
Figure 2E:
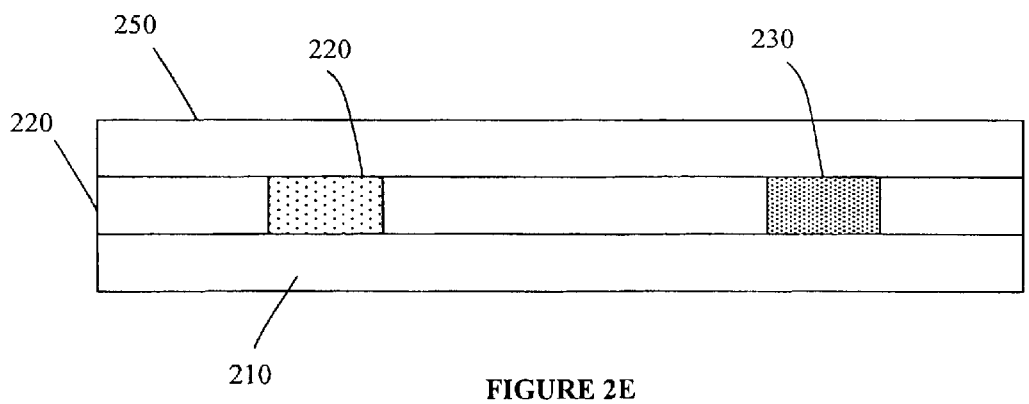
Figure 3A:
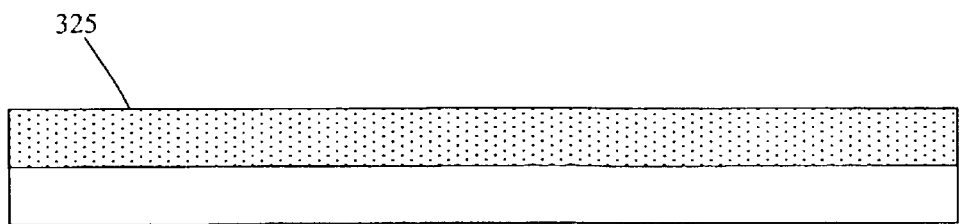
FIGS. 3A–3D are sectional views of an optical apparatus as covered by an embodiment of the present invention at various stages of an alternative method of manufacuture.
Figure 3B:
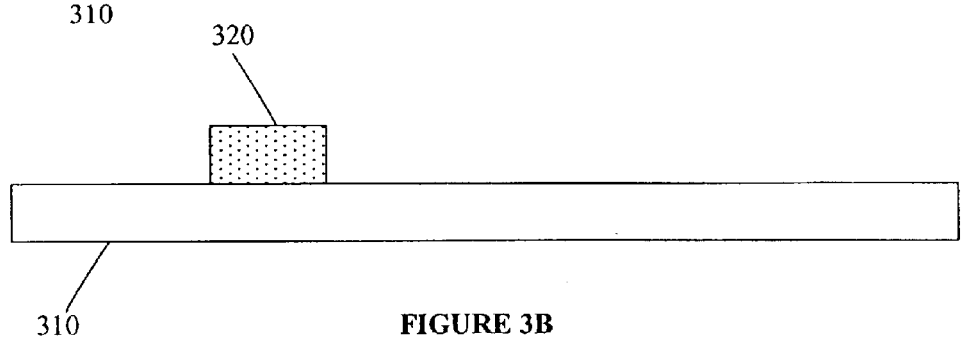
Figure 3C:
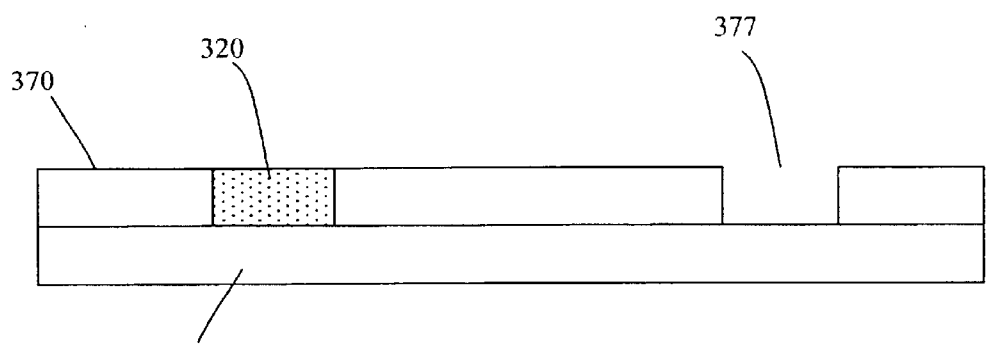
Figure 3D:
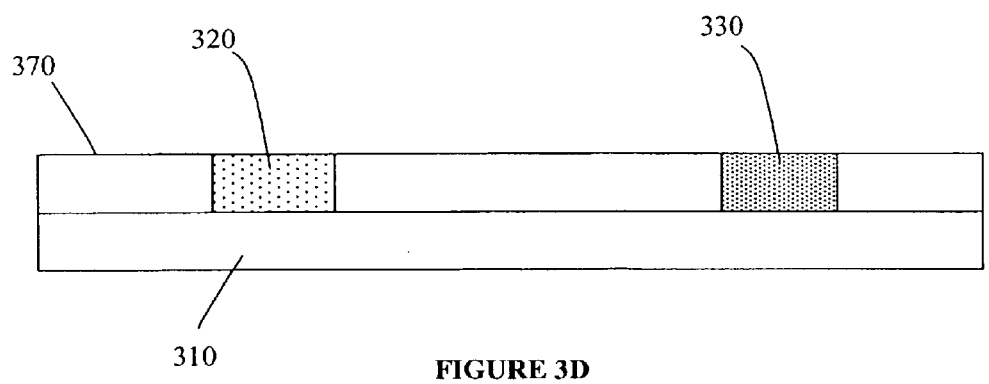

After filling the channels 275, 277 the waveguide core pre-polymer is allowed to cure in the channel 275, 277 to form the organic polymer comprising the waveguide cores, 220, 230. In certain embodiments, it is desirable to fill the channels 275, 277 with a slight excess of the core pre-polymer, to compensate for shrinkage of the polymer during the curing step. In embodiments, where filling produces non-planar waveguide cores 220, 230, it is desirable to include after filling a step of planarizing the surface of the lower cladding 270 or substrate 210 to remove excess amounts of polymer formed exterior to the channels 275, 277, as shown in FIG. 2D. Planarization may be achieved via mechanical polishing, chemical-mechanical planarization or other techniques well known to those skilled in the art. Finally, a second cladding 280 is conventionally deposited over waveguide cores 220, 230 as shown in FIG. 2E.

In embodiments where the first waveguide core 220 comprises a second organic polymer different from the organic polymer of the second waveguide core 230, then forming the first waveguide core 220 proceeds substantially the same as described herein for forming the second waveguide core 230. In such embodiments, for example, forming the first waveguide core 220 includes forming a channel 275 in or on the substrate 210 and cladding 270 and filling the channel 275 with the second organic polymer.

Using like reference numbers to illustrate structures analogous to those show in FIG. 2, another embodiment of the method of manufacturing an optical apparatus, is illustrated in FIG. 3. In this embodiment, the first waveguide core 320 comprises an inorganic material such as silica or lithium niobate. The method includes providing a substrate 310 comprising an inorganic material such as silica, and forming the first waveguide core 320, by depositing a core layer 325, doping the core layer 325 with dopants such as germanium, and patterning the core layer 325 to form the first waveguide core 320. In some embodiments, the core layer 325 and dopant are deposited at the same time. The silica substrate 310 and later deposited cladding layer 370 serve as the cladding for the first waveguide core 320.

In some embodiments, it is advantageous to fabricate the first waveguide core 320 before fabricating the second waveguide core 330. This follows because the processing conditions, such as high temperature (e.g., about 1000° C.) and highly reactive etchants (e.g., HF) used for forming optical devices comprising the first waveguide core materials 320 would likely damage organic polymers of the second waveguide core 330. Then, after forming the first waveguide core 320, a channel 377 is formed in or on the substrate 310 or cladding 370 for depositing the organic polymer used to form the second waveguide core 320, similar to that illustrated in FIG. 2 and described above.

Figure 4:
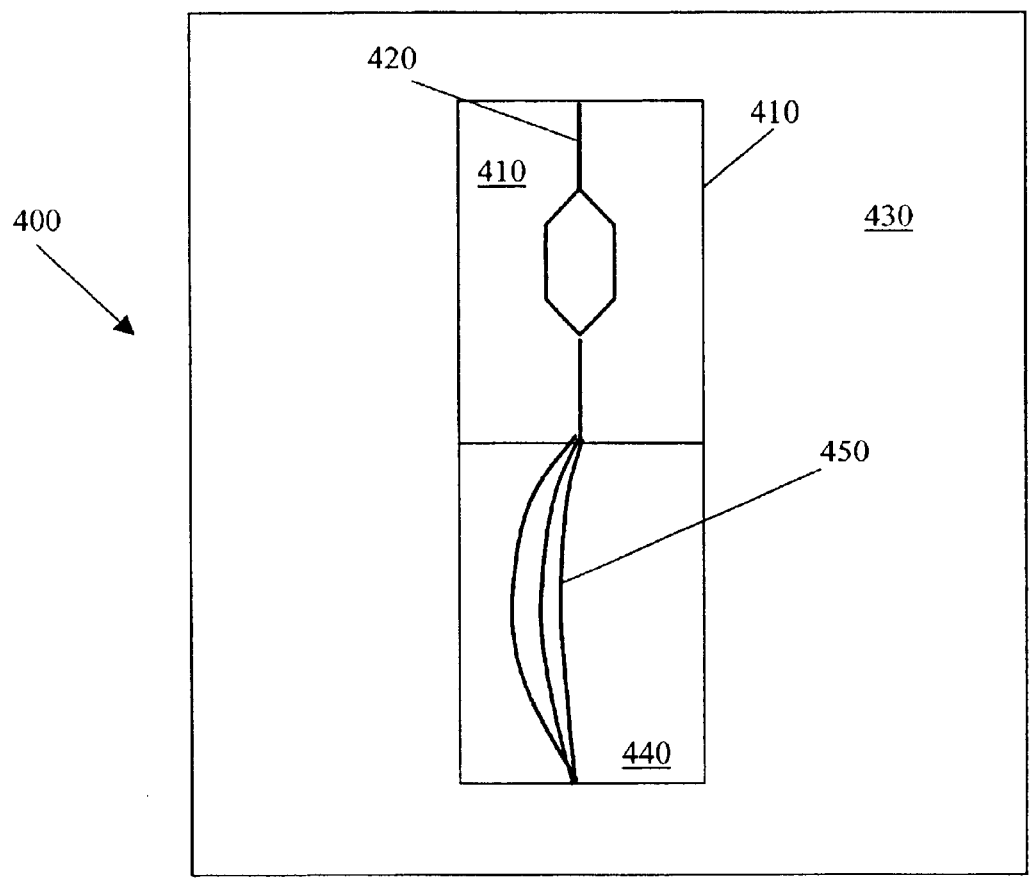
FIG. 4 illustrates a plan view of an optical integrated circuit, which may form one environment in which an optical apparatus similar to that shown in FIG. 1 may be used.

Turning to FIG. 4, illustrated is a plan view of an optical integrated circuit 400, that forms another embodiment of the present invention. The optical integrated circuit 400 comprises a first optical device 410, which includes a first waveguide core 420 formed in or on a substrate 430. The optical integrated circuit 400 further comprises a second optical device 440, which includes a second waveguide core 450 comprising a polymer formed in or on the same substrate 430 and optically coupled to the first waveguide core 420.

Any of the embodiments of the first and second waveguide cores 420, 450 described herein may be included in the optical integrated circuit 400. For example, in certain preferred embodiments of the optical integrated circuit 400, the first optical waveguide core 410 comprises a second organic polymer. The first and second optical devices 410, 440 comprise any number of devices commonly used in the opto-electronics industry, including optical switches, array waveguide gratings, electro-optical modulators, optical splitters or optical amplifiers.

Although the present invention has been described in detail, those skilled in the art should understand that they can make various changes, substitutions and alterations herein without departing from the scope of the invention.

What is claimed is:

1. An optical apparatus, comprising:
   a substrate;
   a first waveguide core formed in said substrate; and a second waveguide core comprising an organic polymer formed in said substrate and serially optically coupled to said first waveguide core, wherein said second waveguide core has a different composition than said first waveguide core.

2. The optical apparatus of claim 1, wherein said first waveguide core comprises a second organic polymer.

3. The optical apparatus of claim 1, wherein said first waveguide core comprises an inorganic material.

4. The optical apparatus of claim 1, wherein one of said first and second waveguide cores is undoped and the other of said first or second waveguide core is doped by rare earth atoms.

5. The optical apparatus of claim 1, wherein said first waveguide core has a less electro-optically controllable refractive index than said second waveguide core.

6. The optical apparatus of claim 1, wherein a refractive index of said first waveguide core is within about ±0.001 of a refractive index of said second waveguide core.

7. The optical apparatus of claim 1, further including a cladding for said second waveguide core comprising a polymer selected from the group consisting of:

polyamide;

polyolefin;

polyacrylates;

poly(meth)acrylates;

polyethers;

polycarbonates; and polysilsesquioxanes.

8. A method of manufacturing an optical apparatus, comprising:

providing a substrate;

forming a first waveguide core in said substrate; and forming a second waveguide core comprising an organic polymer in said substrate, said second waveguide core serially optically coupled to said first waveguide core, wherein said second waveguide core has a different composition than said first waveguide core.

9. The method as recited in claim 8, wherein forming said second waveguide core includes forming a first channel in said substrate and filling said channel with said organic polymer.

10. The method as recited in claim 9, wherein said channel is formed by reactive ion etching.

11. The method as recited in claim 9, wherein said filling said channel with said organic polymer is accomplished using an ink-jet sprayer.

12. The method as recited in claim 11, wherein said ink-jet sprayer contains one or both of a pre-polymer of said organic polymer and a cross-linking agent.

13. The method as recited in claim 9, wherein forming said second waveguide core further includes planarizing a surface of said substrate after said filling.

14. The method as recited in claim 9, wherein forming said first waveguide core includes forming a second channel in said substrate and filling said second channel with a second organic polymer.

15. The method as recited in claim 14, wherein pre-polymers of said organic polymer and said second organic polymer are capable of wetting each other.

16. The method as recited in claim 14, wherein pre-polymers of said organic polymer and said second organic polymer are miscible with each other.

17. The method as recited in claim 9 wherein said substrate is comprised of an inorganic material and said first waveguide core comprises said inorganic material doped with a rare earth metal.

18. An optical integrated circuit, comprising:

a first optical device including:
  a first waveguide core formed in a substrate; and
a second optical device including:
  a second waveguide core comprising an organic polymer formed in said substrate and serially optically coupled to said first waveguide core, wherein said second waveguide core has a different composition than said first waveguide core.

19. The optical integrated circuit as recited in claim 18, wherein said first optical waveguide core comprises a second organic polymer.

20. The optical integrated circuit as recited in claim 18, wherein said first or second optical devices are individually selected from the group consisting of:

an optical switch;

an array waveguide grating;

an electro optical modulator;

an optical splitter; and an optical amplifier.

* * * * *